March 25, 1958     W. C. MEIBAUM, JR     2,827,925
MEANS FOR SECURING A MEMBER WITHIN A TUBE
Filed Oct. 20, 1955
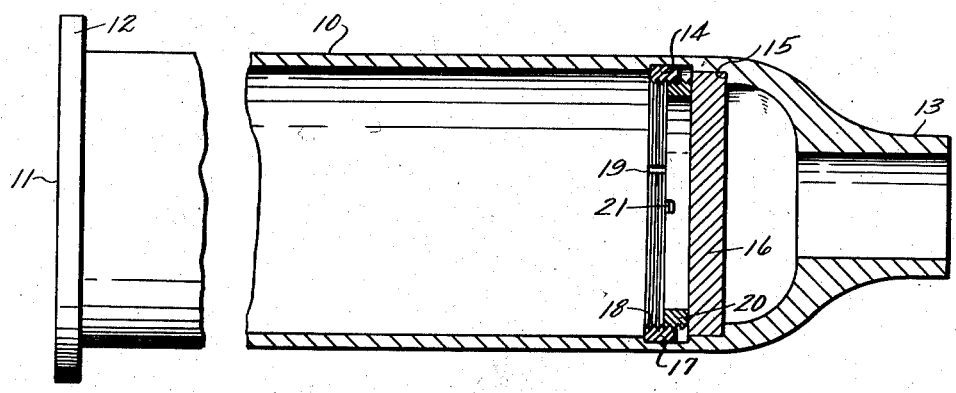
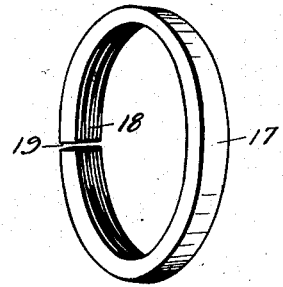     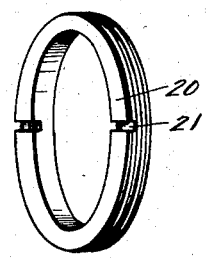
INVENTOR.
WALTER C. MEIBAUM, JR.
BY
Edward M. Tittle
HIS ATTORNEY

United States Patent Office 2,827,925
Patented Mar. 25, 1958

2,827,925

MEANS FOR SECURING A MEMBER WITHIN A TUBE

Walter Charles Meibaum, Jr., Cincinnati, Ohio, assignor to General Electric Company, a corporation of New York Application October 20, 1955, Serial No. 541,781

7 Claims. (Cl. 138—44)

The present invention relates to a means for securing a member within a tube and, more particularly, to a novel arrangement for securing a disc or similar member transversely of the inside of a tube to prevent the axial movement of the disc relative to the tube.

For various reasons, it is desirable in many applications to secure members of various configurations within tubes. Specifically, it may be desirable to insert a disc transversely of the tube in order to divide the tube into partitions or sections. In other cases, the insertion of an orifice plate is the particular object in mind. In still other cases, it may be desired to close the end of a tube at the point of change of cross-sectional area of the tube and at some distance from the open end thereof. A problem is encountered when the particular disc or similar member is to be located inside the tube at some distance from the open end. If a disc is to be located some distance from the open end of a relatively small tube, it is very difficult to securely position the disc therein with any degree of accuracy and hold it against axial movement relative to the tube. In some cases, a portion of the internal diameter of the tube may be threaded and the disc screwed into the threaded portion. However, it is not too practical to machine accurate threads on the internal diameter of a tube beyond relatively short distances from the mouth of the tube. The disc may also be secured within the tube by a shrink fit which has the disadvantage in that it may not provide a tight fit under heavy loading. This is especially applicable where the tube happens to be a shaft which may rotate at high speeds. The disc may be pinned within the tube by drilling the tube and inserting radial pins in the disc. This has the disadvantage of weakening the tube at the drill hole and the securing forces being no stronger than the shearing stress exerted on the pins.

The object of the present invention is to provide a means for securing a disc or similar member within a tube that is not subject to the above disadvantages.

A further object of the invention is to provide a means for securing such a disc within a tube, which disc may be securely fastened in place at a considerable distance from the open end of the tube.

Another object of the invention is to provide a means for securing a disc in place which, including the disc, comprises only three relatively simple machined parts, and secures the disc in position to withstand extremely high rotative or axial forces.

Briefly stated, in accordance with a preferred execution of my invention, I provide a stop member on the inner surface of the tube against which the disc-like member is located to limit motion in one direction. A recess is provided on the inner surface of the tube to accommodate an internally threaded snap ring or its equivalent and a second externally threaded locking ring type member is screwed into the snap ring to bear against the disc, thus spreading the snap ring and the disc apart and holding the disc securely in position.

My invention will be better understood from the following description taken in connection with the accompanying drawing and its scope will be pointed out in the appended claims.

In the drawing:

Figure 1 is a foreshortened cross-sectional view showing the application of my invention to a tube or shaft;

Figure 2 is a perspective view of the snap ring and;

Figure 3 is a perspective view of the locking ring.

Referring first to Figure 1, there is shown a tube or shaft 10 having an internal bore and being of relatively long axial length from the open end 11. End 11 may have a flange 12 thereon for securement to any suitable means. The particular shaft 10 shown, has a reduced portion 13 which is intended for securement to a device which is not pertinent to the present disclosure. The shaft may, of course, be of other configurations and with or without the reduced portion 13. An annular recess 14 is provided in a suitable location in the internal surface of the tube where the obstruction is to be placed. The machining or recess 14 need not be particularly accurate nor smooth since it is merely for the purpose of accommodating a snap ring as will be described. Tube 10 has a shoulder or face 15, as part of a recess which may be separate, or a continuation on a different diameter, of recess 14, machined therein to provide a face against which disc 16 abuts. It can be seen that the shoulder portion has a diameter smaller than disc 16. It will be apparent that the diameter of the portion of the tube that accommodates disc 16 must be greater than the inner diameter of the shoulder but may be less than the inner diameter of the tube or the same. In other words, at least three diameter or equivalent portions must be provided, of which the middle portion must be of greater diameter than the shoulder portion and equal to or less than the tube inner diameter.

A snap lock ring member 17 seen in Figure 2, is provided with internal threads 18 thereon. The threads may be cut on the ring and then a slot 19 cut through the ring to make the ring a snap ring. The ring 17 is deformed to slide in the tube 10 and spring into position in recess 14 at which time the threads 18 return to their correct pitch diameter. An externally threaded lock ring member 20, see Figure 3, is designed to be screwed into ring 17 when the latter is in expanded position within recess 14. Ring 20 may have slots 21 therein to accommodate a spanner wrench for tightening.

In operation, a disc 16 is inserted into shaft 10 from open end 11 to abut against shoulder 15. Snap ring 17 is then deformed and pushed into the shaft to expand in recess 14. Next, lock ring 20 is screwed into snap ring 17 to abut against disc 16. It can be seen that snap ring 17 acts as a shear ring by bearing against the side of recess 14 to transmit the load on disc 16 to the side of recess 14. Lock ring 20 tends to force disc 16 against its shoulder 15 and snap ring 17 against the side of recess 14. Thus, the arrangement shown accurately locates disc 16 tightly in position so that no movement is permitted axially in the tube 10.

It should be noted that disc 16 may be an orifice plate or any other suitable means that serve the purpose in mind. In addition, shoulder 15 may be continuous as shown, or interrupted since it may serve as a stop means and/or sealing means. It will be apparent that suitable gaskets or the like may be used in the construction where desired.

Thus, it will be apparent that the instant invention is a simple arrangement for securing a disc-like member 16 at any position remote from the open end of tube 10 and utilizes parts of loose tolerance while providing a secure fit that may be subjected to high loads.

While a particular embodiment of the invention has been illustrated and described, it will be obvious to those skilled in the art that various changes and modifications may be made without departing from the invention and it is intended to cover in the appended claims all such changes and modifications that come within the true spirit and scope of the invention.

What I claim as new and desire to secure by Letters Patent is:

1. Means for securing a member within a tube comprising, a tubular element having a first inwardly facing recess therein, a second inwardly facing recess having a diameter greater than the first recess, said member being disposed in said first recess, means disposed in said second recess and having inwardly facing threads thereon, and a member having threaded means on its periphery in threaded engagement with said means and in contact with said first member to secure said first member against axial movement within the tube.

2. Means for securing a member within a tube comprising, a tubular element having a first inwardly facing recess therein, a second inwardly facing recess having a diameter greater than the first recess, said member being disposed within said first recess, an annular ring disposed in said second recess and having inwardly facing threads thereon, and an annular ring member having threaded means on its periphery in threaded engagement with said annular ring and in contact with said first member to secure said first member against axial movement within the tubular element.

3. Means for securing an annular member within a tube comprising a tubular element having an inwardly facing recess therein, said recess having one part thereof of greater diameter than the other part, said annular member being disposed in the lesser diameter part of the recess, a snap ring disposed in the larger diameter part of the recess and having threads on the inner face thereof, a locking ring disposed in threaded engagement with said snap ring and in contact with said annular member to secure said annular member against axial movement within said tube.

4. Means for securing an annular member within a cylindrical tube transversely thereof comprising, a cylindrical tube having an inwardly directed abutting face thereon, an inwardly facing recess in said tube adjacent the abutting face and of larger diameter than said face, a snap shear ring disposed in said recess and having threads on the interior surface thereof, said annular member being disposed within said tube in abutting relation to said face, and an annular lock ring having threaded engagement with said shear ring and in contact with said annular member to secure said member against axial movement within said tube.

5. Means for securing a circular ring member within a cylindrical tube transversely thereof comprising, a cylindrical tube having a shoulder on the inner surface thereof projecting into the tube, said circular ring member being disposed against said shoulder, an annular recess on the inner surface of the tube having a diameter larger than the inner diameter of the tube, a snap shear ring disposed in said recess and having threads on the inner surface thereof, and a locking ring member in threaded engagement with said snap ring and abutting said circular ring member to lock the latter against axial movement within said tube.

6. Means for securing a disc within a cylindrical tube transversely thereof comprising, a cylindrical tube, a projecting annular shoulder on the inner surface of said tube, said disc being disposed against said shoulder to limit axial motion in one direction within said tube, an annular recess on the inner surface of said tube of larger diameter than the inner diameter of said tube, said disc being between said recess and shoulder, a snap shear ring disposed in said recess and having its inner surface threaded, a locking ring in threaded engagement with said shear ring and in contact with said disc to lock the disc against axial motion in the other direction.

7. Means for securing an annular member within a tube transversely thereof comprising, a tube having an inner configuration providing axial portions of at least three different diameters, the first portion having a diameter larger than the tube inside diameter, the second portion having a diameter smaller than the tube diameter and a third intermediate portion having a diameter equal to or less than the tube diameter and greater than the second diameter, an internally threaded snap ring disposed in said first portion, said annular member being disposed in said third portion, and a locking circular externally threaded member in threaded engagement with said snap ring and abutting said annular member to secure it against axial movement within the tube.

References Cited in the file of this patent

UNITED STATES PATENTS

| 955,160 | Holmes | Apr. 19, 1910 |
| 1,226,896 | Lane | May 22, 1917 |
| 1,767,217 | Kraft | June 24, 1930 |
| 2,025,545 | Muff | Dec. 24, 1935 |
| 2,662,725 | McVeigh | Dec. 15, 1953 |
| 2,712,952 | Lundgren | July 12, 1955 |

FOREIGN PATENTS

| 874,674 | France | May 18, 1952 |